UNITED STATES PATENT OFFICE.

B. S. WELCH, OF BROOKLYN, NEW YORK.

IMPROVEMENT IN CEMENTS.

Specification forming part of Letters Patent No. 8,962, dated May 18, 1852.

*To all whom it may concern:*

Be it known that I, B. S. WELCH, of Brooklyn, in the county of Kings and State of New York, have invented a new and useful Composition or Cement to be Used for Cementing Plaster-Work, &c.; and I do hereby declare that the following is a full, clear, and exact description of its nature, uses, and application.

The nature of my invention consists in a cement composition of which the principal ingredients are common hydrate of lime and resin, for the purpose of forming a cement impervious to water and moisture, and which can be employed above or under ground, in moist places, as a common mortar for building or a plaster to resist the action of the weather and water, by covering with it the insides of cisterns, cellars, and all walls subject to dampness. In its nature it is anhydrous when dry, so far as it relates to being kept in contact with water for any length of time, for no water will combine with it or penetrate it. It resists and is impervious to water.

I will now proceed to describe the composition, component parts, and the method of compounding, mixing, and using the same, so as to enable any person skilled in the art to make and use the said composition or cement.

In quantity I take half a bushel of well-slaked or hydrate of lime, and then I take about one-fifth of a bushel of common resin finely ground to powder or dust and mix it with long and careful stirring and pressing along with the said lime, using as much water as will make them into any desired thickness, according to the purpose for which they are intended, and according to the quantity and kind of substance I afterward mix along with it.

For underground, to be continually in contact with water, I then add to the foregoing one-fourth of a bushel of hydraulic or any of the argillaceous cement powders, and mix all up well together. After this I add about one-half of a bushel of fine sand, and, having mixed all thoroughly, it is fit to be used for any underground purpose or applied as a cement or plaster to resist the action of water or moisture. To make it set quick, and this is the only purpose for which I use it, I employ about one-fourth (more or less) of the plaster-of-paris along with the mixture described.

I have tried the cement consisting of the composition stated without any of the Roman or common hydraulic cements in it, and after it had lain in contact with water for ten months it was perfectly dry, and not a drop of water had penetrated it. Leaving out the hydraulic cement and the plaster-of-paris it makes an excellent mortar for the joints of bricks and stones in all buildings, and it makes a most excellent plaster for the walls of houses, both outside and inside. It makes a plaster exceedingly suitable for the fronts of brick buildings to make them appear like stone structures, and as it is impervious to water it never scales off. For plastering the inside of houses, especially underground apartments, and those which are situated in damp positions, it affords a most complete remedy for damp walls, and thus it will tend to promote comfort and longevity. It is put on like common mortar or plaster. For ornamental work—such as cornices—no sand is employed, and in that case it makes a beautiful smooth cement for buildings, both inside and out, such as for cornices, moldings, &c.

The principal ingredients which act the most important part in this cement are the ground resin and the lime mixture; but the others I mix along with it for the various purposes stated and to render it less expensive. I do not assert specifically that the proportions stated will answer the purpose, and no other, for I have tried the cement with one-sixteenth of the resin to that of the lime, and I have also tried it with one-third, and have found the lesser quantity answer the purpose of making a cement that would not absorb water.

The resin, finely ground and well mixed with the fine hydrate of lime with cold water, forms the principal feature of my new improved cement. Wax and other hard substances of a like nature which can be finely pulverized and mixed like the resin in cold water with the lime will form a cement nearly like it; but I choose the resin as being the cheapest and the best so far as I know. Neither it nor the wax, as stated, have ever been known or used to produce a compound of the like nature and for the same purpose.

Having thus descrbed my invention, I claim—

The primary cement herein described, formed of the hydrate of lime in a finely-subdivided state and resin in a finely-subdivided state, mixed together with water in a cold state, for the purpose set forth.

B. S. WELCH.

Witnesses:
O. D. MUNRO,
ED. POLHAMUS.